(12) United States Patent
Agarwal et al.

(10) Patent No.: US 12,332,815 B1
(45) Date of Patent: Jun. 17, 2025

(54) DYNAMICALLY ASSIGNING COMPRESSION PRIORITY TO CACHED ENTRIES IN STORAGE DEVICES

(71) Applicant: SanDisk Technologies LLC, Austin, TX (US)

(72) Inventors: Dinesh Kumar Agarwal, Bangalore (IN); Vinod Sharma, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/606,588

(22) Filed: Mar. 15, 2024

(51) Int. Cl.
*G06F 12/00* (2006.01)
*G06F 12/02* (2006.01)
*G06F 13/16* (2006.01)

(52) U.S. Cl.
CPC ...... *G06F 13/1694* (2013.01); *G06F 12/0246* (2013.01); *G06F 13/1673* (2013.01)

(58) Field of Classification Search
CPC ............. G06F 13/1694; G06F 12/0246; G06F 13/1673
USPC ........................................................ 711/154
See application file for complete search history.

(56) References Cited

U.S. PATENT DOCUMENTS

| | | | |
|---|---|---|---|
| 9,946,462 B1 | 4/2018 | Li | |
| 10,831,652 B2 | 11/2020 | Lee | |
| 10,942,660 B2 | 3/2021 | Jin | |
| 10,970,228 B2 | 4/2021 | Hanna | |
| 2018/0275873 A1* | 9/2018 | Frid | G06F 3/064 |
| 2019/0370357 A1* | 12/2019 | Kucherov | G06F 16/9014 |
| 2023/0315285 A1 | 10/2023 | Ionin | |

\* cited by examiner

*Primary Examiner* — Mardochee Chery
(74) *Attorney, Agent, or Firm* — Arlene P. Neal; Neal Blibo LLC

(57) ABSTRACT

A storage device minimizes updates to compressed msets based on a priority criterion. The storage device includes a memory including a logical-to-physical (L2P) table divided into msets that include a range of entries in the L2P table. The storage device also includes memory to cache a first set of msets. A controller on the storage device accesses the first set of msets to quickly read data from and write data to the memory device. The controller determines a uLayer state for a first mset in the first set of msets, a read ratio for the first mset, a prediction for the first mset, and/or a queue depth for the first mset in determining whether the first mset meets the priority criterion and is ready for compression. The controller assigns a high priority to the first mset if the first mset meets the priority criterion and compresses the first mset.

20 Claims, 10 Drawing Sheets

DYNAMICALLY ASSIGNING COMPRESSION PRIORITY TO CACHED ENTRIES IN STORAGE DEVICES

BACKGROUND OF THE INVENTION

A storage device may be communicatively coupled to a host and to non-volatile memory including, for example, a NAND flash memory device on which the storage device may store data received from the host. The storage device may store data in blocks on the memory device and the host may address the data using logical block addresses that may be mapped to physical addresses on the memory device. The logical block address to physical address mappings may be stored in a logical-to-physical (L2P) table, portions of which may be cached in a random-access memory (RAM) on the storage device for faster access. Entries of the L2P table may be divided in msets, wherein each mset may include a range of entries in the L2P table. For example, mset X may include entries from the zero to thirty-two-megabyte (MB) range in the L2P table and mset Y may include the entries from the thirty-three to sixty-four MB range in the L2P table. The storage device may access the cached msets to quickly read data from and write data to the memory device.

If, for example, the memory device can store one terabyte (TB) of data, the space needed for the L2P table may be one gigabyte (GB). However, the RAM in the storage device may be one MB. As such, to process commands from the host, a controller in the storage device may have to swap msets stored in the L2P table on the memory device in and out of the RAM, which may affect the overall performance of the storage device. To provide faster access to more msets, the controller may also cache portions of the L2P in a host memory buffer (HMB), i.e., a cache on the host which may be, for example, sixty-four MB. When the controller needs to access a mset, rather than retrieving the needed mset from the memory device, the controller may more quickly retrieve the mset from the HMB and cache the mset in the RAM to process read/write commands. Due to the limited sizes of the HMB and RAM, the controller may be unable to cache all needed msets in the HMB and RAM and the controller may still have to retrieve some msets from the memory device, which may continue to affect the overall performance of the storage device.

To address the cache size issue, the controller may compress some msets to fit more msets in the limited RAM space and virtually increase the overall cache size. The controller may compress the msets wherever there is idle processing or system time. However, when a compressed mset is updated by a write command from the host, the controller may have to decompress the mset, perform the update, and recompress the mset. The time associated with synchronizing a compressed mset with updated information may be dependent on the number of updates being performed, wherein if many updates need to be performed, the synchronization time may be long and may have a negative impact on the storage device performance. Consider an example where mset X and mset Y are compressed and cached in the RAM. When the controller processes read and write operations using the L2P data in mset X and mset Y, the controller may quickly retrieve the L2P information from the RAM. If the host updates logical block address(es) in mset X, to ensure that the L2P data in mset X is up to date, the controller may decompress mset X and update the L2P data. The controller currently compresses msets whenever there is an idle period without considering the likelihood of an mset needing to be updated within a future period.

The adverse impact on the storage device performance caused by updating a compressed mset may be minimized if an approach is provided to reduce updates on compressed msets.

SUMMARY OF THE INVENTION

In some implementations, the storage device may minimize updates to compressed msets by limiting compression of msets based on a priority criterion. The storage device includes a memory including a logical-to-physical (L2P) table which is divided into msets that include a range of entries in the L2P table. The storage device also includes a random-access memory to cache a first set of msets and a controller to access the first set of msets to quickly read data from and write data to the memory device. The controller may execute dynamic priority approaches for compression in selecting msets that meet a priority criterion and are ready for compression. The controller may also assign a high compression priority to the msets that are ready for compression based on the priority criterion. During an idle processing period on the storage device, the controller may compress the msets with the high compression priority.

In some implementations, a method is provided on a storage device for minimizing updates to compressed msets on the storage device by limiting compression of msets based on a priority criterion. The method includes accessing a first set of msets cached on a random-access memory in the storage device to quickly read data from and write data to a memory device. The method also includes executing dynamic priority approaches for compression in selecting msets that meet the priority criterion and are ready for compression. The method also includes assigning a high compression priority to the msets that are ready for compression based on the priority criterion. The method further includes compressing the msets with the high compression priority during an idle processing period on the storage device.

In some implementations, a storage device may minimize updates to compressed msets by limiting compression of msets based on a priority criterion. The controller on the storage device may access the first set of msets to quickly read data from and write data to the memory device. The controller may also determine a uLayer state for a first mset in the first set of msets, a read ratio for the first mset, a prediction for the first mset, and/or a queue depth for the first mset in determining whether the first mset is ready for compression. The controller may assign a high compression priority to the first mset if the first mset is ready for compression and compress the first mset assigned the high compression priority during an idle processing period.

Figure 1:
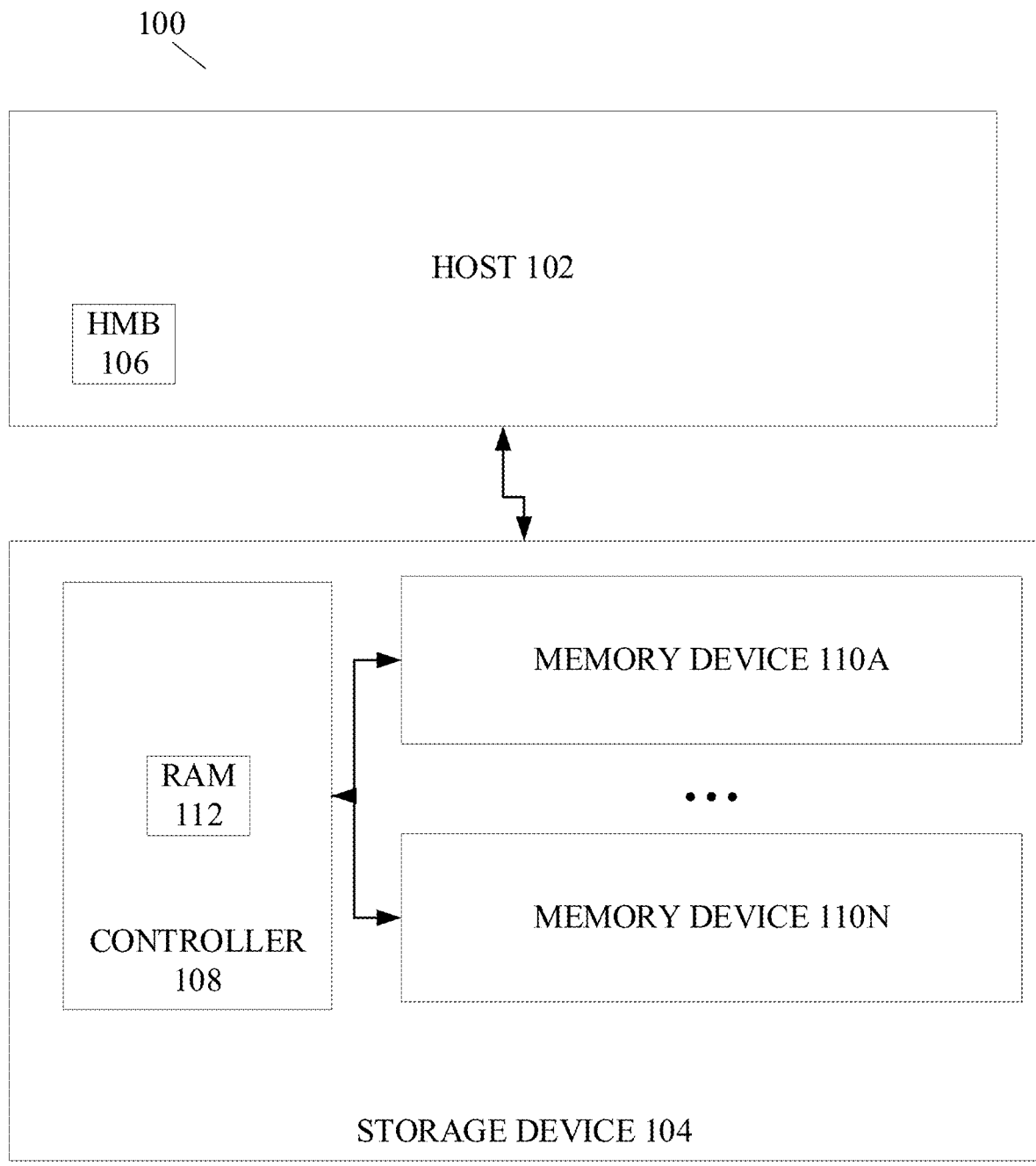
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may include a host memory buffer (HMB) 106 that may be used to cache data that is accessible to storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a controller 108, one or more non-volatile memory devices 110a-110n (referred to herein as the memory device(s) 110), and a random-access memory (RAM) 112. Storage device 104 may be, for example, a solid-state drive (SSD), and the like. RAM 112 may be temporary storage such as dynamic RAM (DRAM) or a static RAM (SRAM) that may be used to cache information.

Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104. Memory device 110 may be divided into blocks.

Host 102 may address data stored in physical blocks on memory device 110 using logical block addresses, wherein the logical block addresses may be mapped to physical addresses on the memory device. The logical block address to physical address mappings may be stored in a logical-to-physical (L2P) table. Entries of the L2P table may be divided in msets, wherein each mset may include a range of entries in the L2P table. For instance, mset A may include entries from the zero to thirty-two MB range in the L2P table, mset B may include the entries from the thirty-three to sixty-four MB range in the L2P table, mset C may include the entries from the sixty-five to ninety-six MB range in the L2P table, and so on. Controller 108 may cache some of the msets in the L2P table (also referred to herein as a first set of msets) in RAM 112 and some of the msets (also referred to herein as a second set of msets) in HMB 106. For example, controller 108 may store msets A-N in HMB 106 and msets X-Z in RAM 112. If controller 108 needs to access data stored in a mset cached in HMB 106, controller 108 may request that mset from host 102 and cache that mset in RAM 112. The storage device may access the msets cached in RAM 112 to quickly read data from and write data to memory device 110.

To store more data in RAM 112, controller 108 may compress one or more msets cached in RAM 112. As such, RAM 112 may include compressed msets and uncompressed msets. When host 102 sends a read command or write command to storage device 104, controller 108 may access the data referenced in the read or write command by using the logical block address provided by host 102 to retrieve a cached mset including the associated L2P entry. A host write command to storage device 104 may cause controller 108 to update an L2P entry in an mset. Prior to updating the L2P mset entry, controller 108 may store updates for a cached mset in a uLayer, i.e., a space on storage device 104 for storing updates provided by host 102 to storage device 104. The updates from host 102 may remain in the uLayer until it is synchronized with NAND data that is cached in RAM 112 or HMB 106. Controller 108 may synchronize or merge the data in the uLayer with a cached copy of an mset and delete the update from the uLayer.

Consider an example where msets A-N are cached in HMB 106 and msets X-Z are cached in RAM 112. If during an idle period controller 108 compresses msets A-C and there are subsequent updates to msets, A, C, X and N, controller 108 may merge/synchronize the data in the uLayer for msets X and N with the cached msets X and N. However, controller 108 may be unable to merge the data in the uLayer for msets A and C with the cached msets A and C as these msets are compressed and may not be updated prior to being decompressed by controller 108. Depending on the quantity of data being updated, decompression of msets A and C to synchronize these msets with updates in the uLayer may use processing time that may affect the performance of storage device 104. Without decompressing msets A and C and updating these msets with the data in the uLayer, the data in the uLayer may be out of synch with the compressed cached data. Controller 108 may thus execute dynamic priority approaches for compression, wherein controller 108 may assign a high compression priority to the msets that are ready for compression based on a dynamic priority criterion to reduce the occurrence of the compressed cached msets having updates in the uLayer.

In an implementation, controller 108 may select an mset from RAM 112 if controller 108 determines that there are less than a predefined number of entries in the uLayer for that mset and may assign a high compression priority to that mset. For example, if RAM 112 include msets X and Y and the uLayer has updates for mset X, controller 108 may select mset Y for compression when controller 108 determines that there are no or minimal entries in the uLayer for mset Y and may assign a high compression priority to mset Y. Controller 108 may compress msets assigned a high compression priority during an idle processing time on storage device 104.

Controller 108 may determine that mset X has greater than a predefined number of update entries (for example, one or more update entries) in the uLayer and may assign a lower compression priority to mset X. When controller 108 merges the uLayer entries with the cached mset X such that the uLayer no longer has entries that may cause the data in mset X to be out of synch or if controller 108 determines that there is a low possibility of mset X being out of synch with the uLayer if compression is performed on mset X, controller 108 may dynamically increase the compression priority of mset X to a high compression priority. Once the compression priority of mset X increases, controller 108 may compress mset X during an idle processing time on storage device 104.

Controller 108 may perform compression on msets with the lower compression priority if RAM 112 and/or HMB 106 are full. Controller 108 may not perform compression on msets with the lower compression priority if RAM 112 and/or HMB 106 are not full even if there is idle processing time on storage device 104. Prior to performing compression on msets with the lower compression priority when RAM 112 and/or HMB 106 are full, controller 108 may update the msets with the lower compression priority with the uLayer entries to avoid having to subsequently synchronize/merge the msets with data in the uLayer after the msets have been compressed. As such, controller 108 may base the compression priority for a cached mset on the uLayer state for the mset and/or the corresponding entries for the mset in the uLayer. Controller 108 may increase the compression priority for a mset if there are no corresponding entries in the uLayer. This ensures that the differences between the data in the uLayer and the cached data remain minimal, and the subsequent synchronization time needed to synchronize the uLayer data with the uncompressed version of a cached mset remains minimal all the time.

In an implementation, if, for example, msets X, Y, and Z have a high compression priority, controller 108 may identify the mset(s) among msets X, Y, and Z with a higher read ratio and select those msets for compression. Controller 108 may determine that a mset has a higher read ratio if the read ratio for the mset is above a threshold that may be determined based on the merging and loading time needed. In an example where one hundred read commands are processed on mset X and fifty read commands are processed on mset Y, even if both mset X and mset Y have a similar number of write commands, controller 108 may determine that mset X has a higher read ratio and may select mset X for compression over mset Y. In another example, if mset X is accessed more frequently than the other msets with the high compression priority, this may contribute to a high read ratio for mset X and controller 108 may select mset X for compression. Controller 108 may select msets with higher read ratio for compression and may not transfer these msets to HMB 106 when RAM 112 becomes full. Controller 108 may thus consider the read ratio in selecting the best candidate mset among a group of msets for compression.

In an implementation, if a mset does not have a high read ratio but controller 108 predicts that the mset is likely to have a high read ratio, controller 108 may treat the mset as having a high read ratio and select the mset for compression. Consider an example where during a sequential read, controller 108 determines that mset X has a high read ratio, controller 108 may predict that one or more sequential msets (for example, mset X+1, mset X+2, and mset X+3) may also have a high read ratio, mark mset X+1, mset X+2, and mset X+3 as having a high read ratio based on the prediction, and select those msets for compression.

In some cases, the queue depth with commands for a first mset may be high and the queue depth with commands for the second mset may be low. Controller 108 may compress the second mset with the low queue depth to ensure that the second mset can be quickly accessed so that processing of the commands for the second mset does not affect the overall performance of storage device 104. Controller 108 may store the first mset with the high queue depth in HMB 106 as controller 108 may pipeline and select one or more commands in the queue depth for processing without affecting the performance of storage device 104. Using these dynamic priority approaches and applying a dynamic priority criterion to cached msets, controller 108 may fully use compression for read paths and minimize the write path impact on compressed msets.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
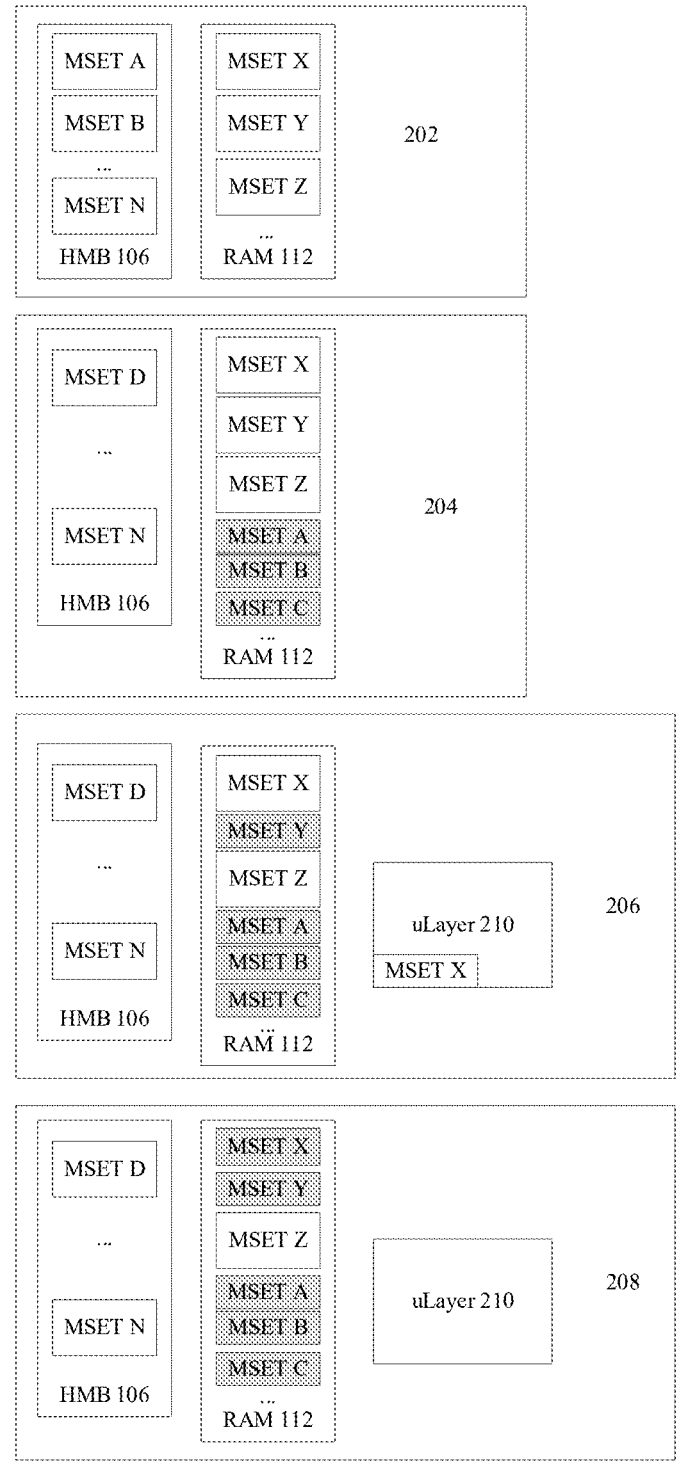
FIG. 2 is a block diagram showing an arrangement for dynamically assigning a compression priority to a mset during a write workload in accordance with some implementations.

FIG. 2 is a block diagram showing an arrangement for dynamically assigning a compression priority to a mset during a write workload in accordance with some implementations. Msets A-N may be cached in HMB 106 and msets X-Z may be cached in RAM 112, as shown by 202. Controller 108 may transfer msets A-C to RAM 112 and assign a high compression priority to msets A-C based, for example, on a write workload or a read ratio. During an idle period, controller 108 may compress msets A-C, as shown by 204. The compressed msets in RAM 112 are shaded.

Controller 108 may select mset Y from RAM 112 and assign a high compression priority to mset Y if controller 108 determines that there are no or minimal entries in uLayer 210 for mset Y. Controller 108 may compress mset Y, assigned a high compression priority, during an idle processing time on storage device 104. Controller 108 may assign a low compression priority to mset X as that mset has updates in uLayer 210, as shown at 206. In ordering the compression priority at this point, controller 108 may first compress msets in RAM 112 with a high compression priority and then msets in HMB 106 with a high compression priority. Controller 108 may not compress mset X with a low compression priority unless RAM 112 and HMB 106 become full.

If RAM 112 and/or HMB 106 become full while uLayer 210 includes updates for mset X, controller 108 may merge the uLayer 210 entries with mset X such that uLayer 210 may no longer have entries that may cause the data in mset X to be out of synch. Controller 108 may dynamically increase the compression priority of mset X to a high compression priority. Once the compression priority of mset X increases, controller 108 may compress mset X during an idle processing time on storage device 104, as shown at 208. As indicated above FIG. 2 is provided as an example. Other examples may differ from what is described in FIG. 2.

Figure 3:
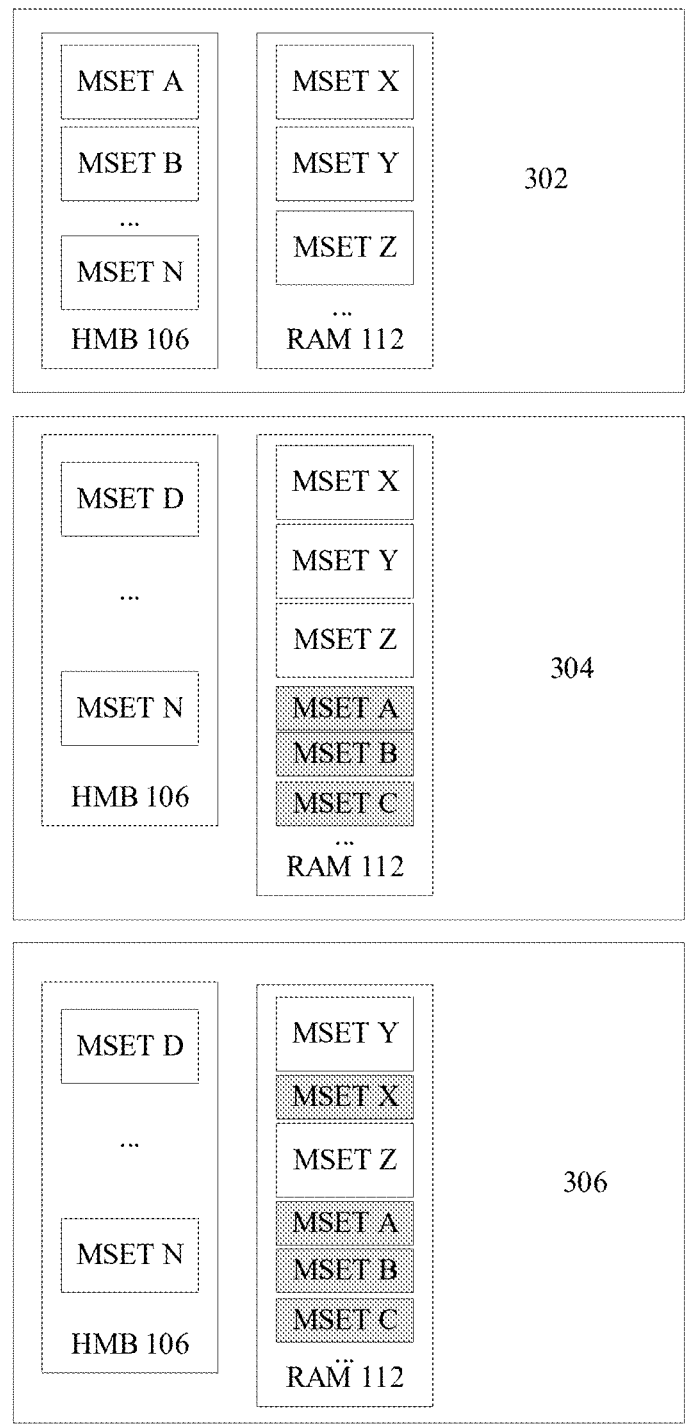
FIG. 3 is another block diagram showing an arrangement for dynamically assigning a compression priority to a mset based on a read ratio in accordance with some implementations.

FIG. 3 is another block diagram showing an arrangement for dynamically assigning a compression priority to a mset based on a read ratio in accordance with some implementations. Msets A-N may be cached in HMB 106 and msets X-Z may be cached in RAM 112, as shown by 302. Controller 108 may transfer msets A-C to RAM 112 and assign a high compression priority to msets A-C based, for example, on a write workload or a read ratio. During an idle period, controller 108 may compress msets A-C, as shown by 304. The compressed msets in RAM 112 are shaded. If msets X, Y, and Z have a high compression priority, controller 108 may select mset X, among msets X, Y, and Z, with a higher read ratio and in ordering the compression priority select mset X as the first mset for compression, as shown at 306. Controller 108 may determine that mset X has a higher read ratio if the read ratio for the mset is above a threshold that may be determined based on the merging and loading time needed. For example, if one hundred read commands have been performed on mset X, fifty read commands have been performed on mset Y and seventy read commands have been performed on mset Z, controller 108 may determine that mset X has a higher read ratio and may select mset X for compression over msets Y and Z. In another example, if mset X is accessed more frequently than the other msets, this may contribute to a high read ratio for mset X and controller 108 may select mset X for compression over msets Y and Z. Controller 108 may select msets with higher read ratio for compression and may not transfer these msets to HMB 106 when RAM 112 becomes full. As indicated above FIG. 3 is provided as an example. Other examples may differ from what is described in FIG. 3.

Figure 4:
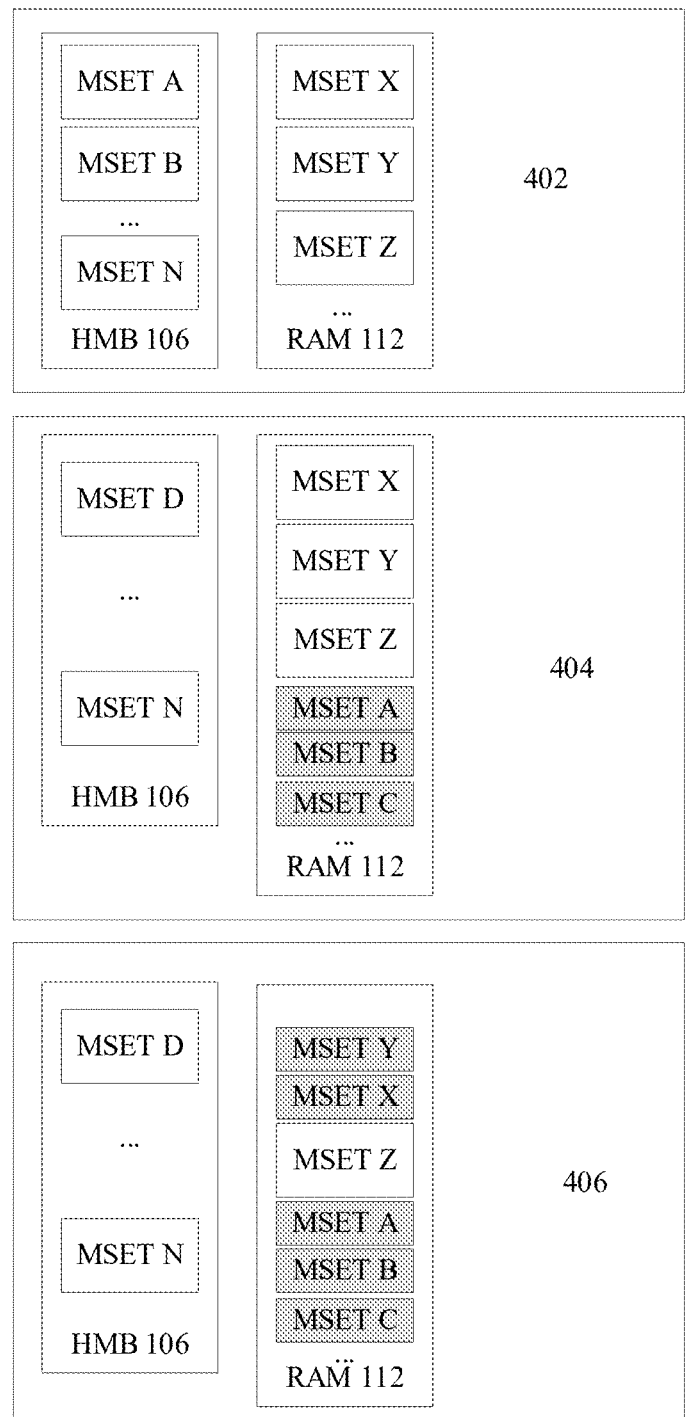
FIG. 4 is a block diagram showing an arrangement for dynamically assigning a compression priority to a mset based on a prediction by a controller in a storage device in accordance with some implementations.

FIG. 4 is a block diagram showing an arrangement for dynamically assigning a compression priority to a mset based on a prediction by a controller in the storage device in accordance with some implementations. Msets A-N may be cached in HMB 106 and msets X-Z may be cached in RAM 112, as shown by 402. Controller 108 may transfer msets A-C to RAM 112 and assign a high compression priority to msets A-C based, for example, on a write workload or a read ratio. During an idle period, controller 108 may compress msets A-C, as shown by 404. The compressed msets in RAM 112 are shaded. If controller 108 has not determined that mset Y has a high read ratio but determines the mset X has a high read ratio and that mset X and mset Y include sequential data, controller 108 may predict that mset Y may have a high read ratio. Controller 108 may thus assign a high compression priority to mset X and mset Y and compress msets X and Y during an idle processing period, as shown by 406. As indicated above FIG. 4 is provided as an example. Other examples may differ from what is described in FIG. 4.

Figure 5:
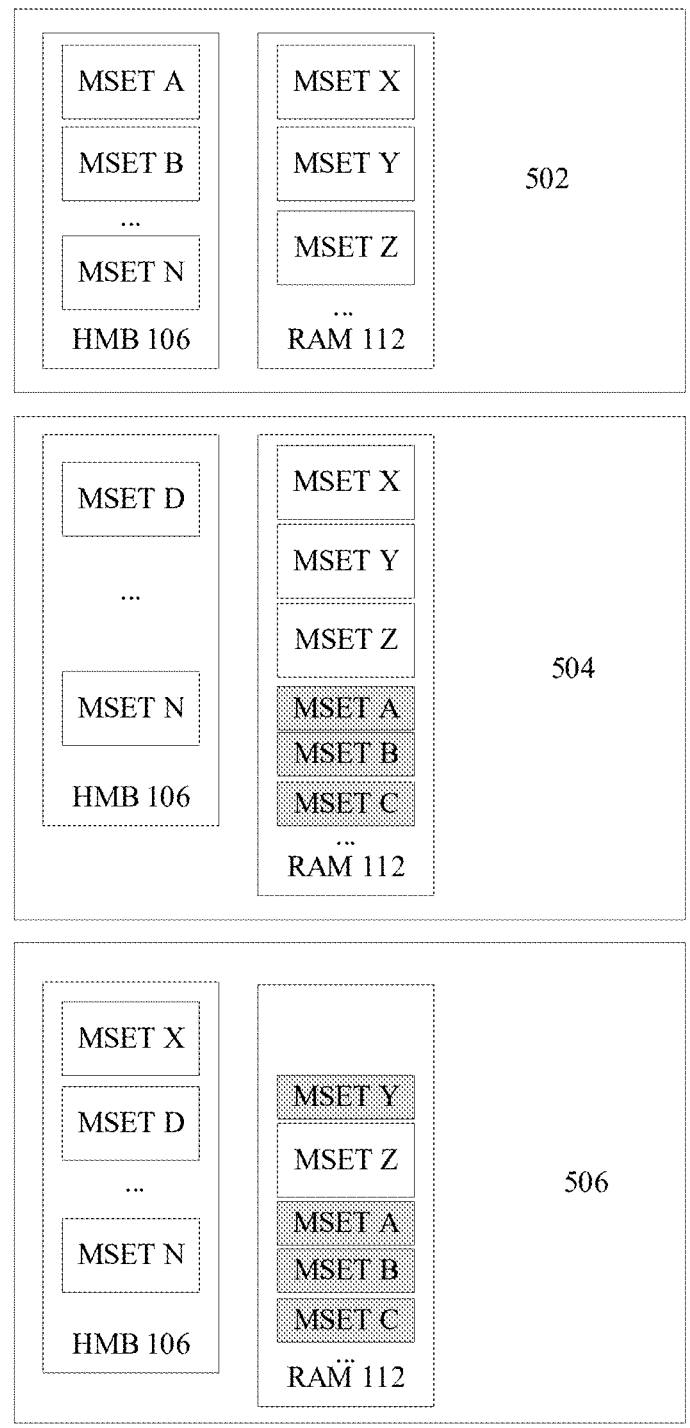
FIG. 5 is a block diagram showing an arrangement for dynamically assigning a compression priority to a mset based on queue depth in accordance with some implementations.

FIG. 5 is a block diagram showing an arrangement for dynamically assigning a compression priority to a mset based on a queue depth in accordance with some implementations. Msets A-N may be cached in HMB 106 and msets X-Z may be cached in RAM 112, as shown by 502. Controller 108 may transfer msets A-C to RAM 112 and assign a high compression priority to msets A-C based, for example, on a write workload or a read ratio. During an idle period, controller 108 may compress msets A-C, as shown by 504. The compressed msets in RAM 112 are shaded. Controller 108 may determine that the queue depth with commands for mset X may be high and the queue depth with commands for mset Y may be low. Controller 108 may compress mset Y with the low queue depth to ensure that mset Y can be quickly accessed so that processing of the commands associated with mset Y does not affect the overall performance of storage device 104, as shown in 506. Controller 108 may store mset X with the high queue depth in HMB 106 as controller 108 may pipeline and select one or more commands in the queue depth for processing without affecting the performance of storage device 104. As indicated above FIG. 5 is provided as an example. Other examples may differ from what is described in FIG. 5.

Figure 6:
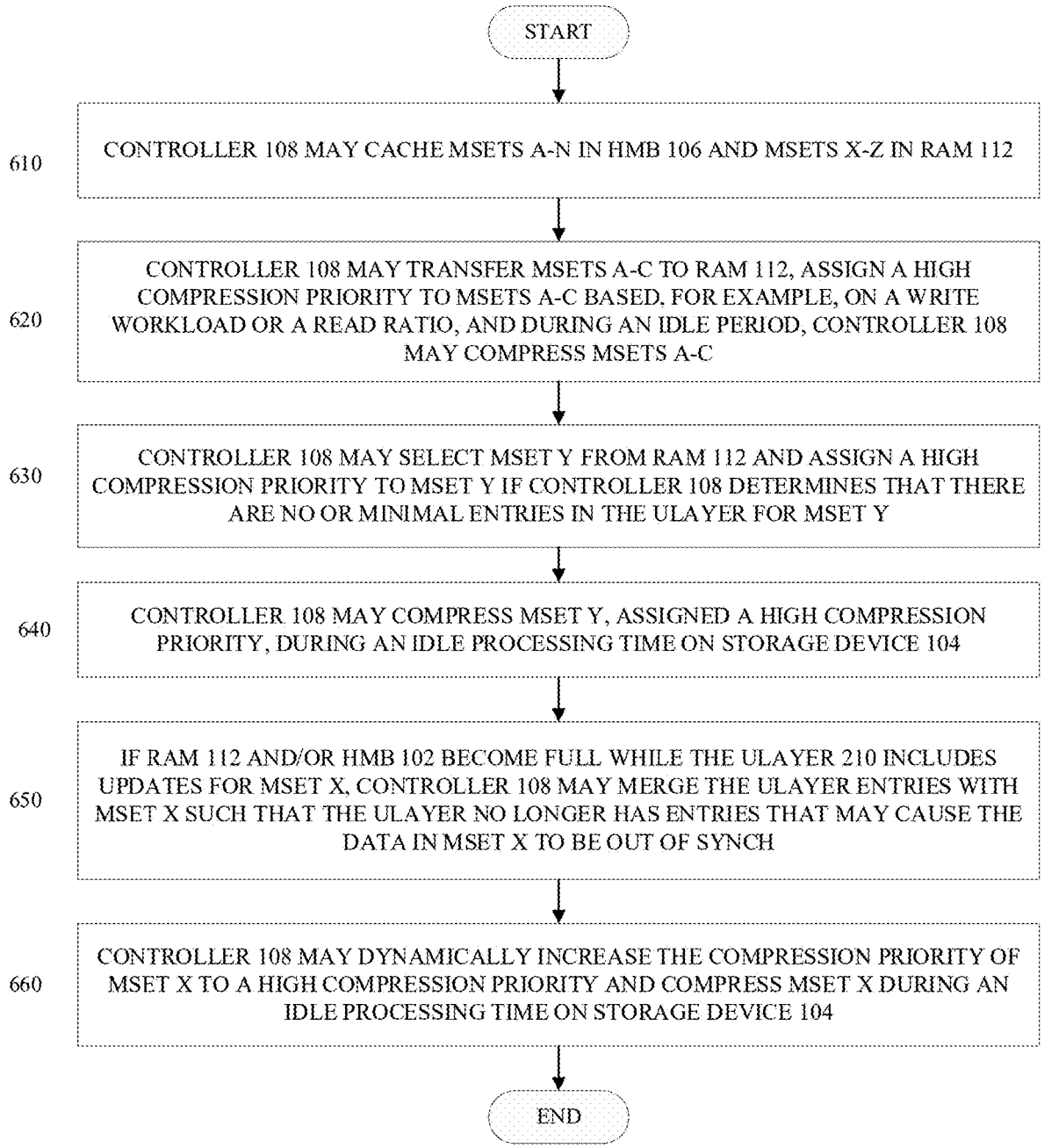
FIG. 6 is a flow diagram of an example process for dynamically assigning a compression priority to a mset during a write workload in accordance with some implementations.

FIG. 6 is a flow diagram of an example process for dynamically assigning a compression priority to a mset during a write workload in accordance with some implementations. At 610, controller 108 may cache msets A-N in HMB 106 and msets X-Z in RAM 112. At 620, controller 108 may transfer msets A-C to RAM 112, assign a high compression priority to mset A-C based, for example, on a write workload or a read ratio, and during an idle period, controller 108 may compress msets A-C. At 630, controller 108 may select mset Y from RAM 112 and assign a high compression priority to mset Y if controller 108 determines that there are no or minimal entries in the uLayer for mset Y. At 640, controller 108 may compress mset Y, assigned a high compression priority, during an idle processing time on storage device 104. At 650, if RAM 112 and/or HMB 106 become full while the uLayer 210 includes updates for mset X, controller 108 may merge the uLayer entries with mset X such that the uLayer no longer has entries that may cause the data in mset X to be out of synch. At 660, controller 108 may dynamically increase the compression priority of mset X to a high compression priority and compress mset X during an idle processing time on storage device 104. As indicated above FIG. 6 is provided as an example. Other examples may differ from what is described in FIG. 6.

Figure 7:
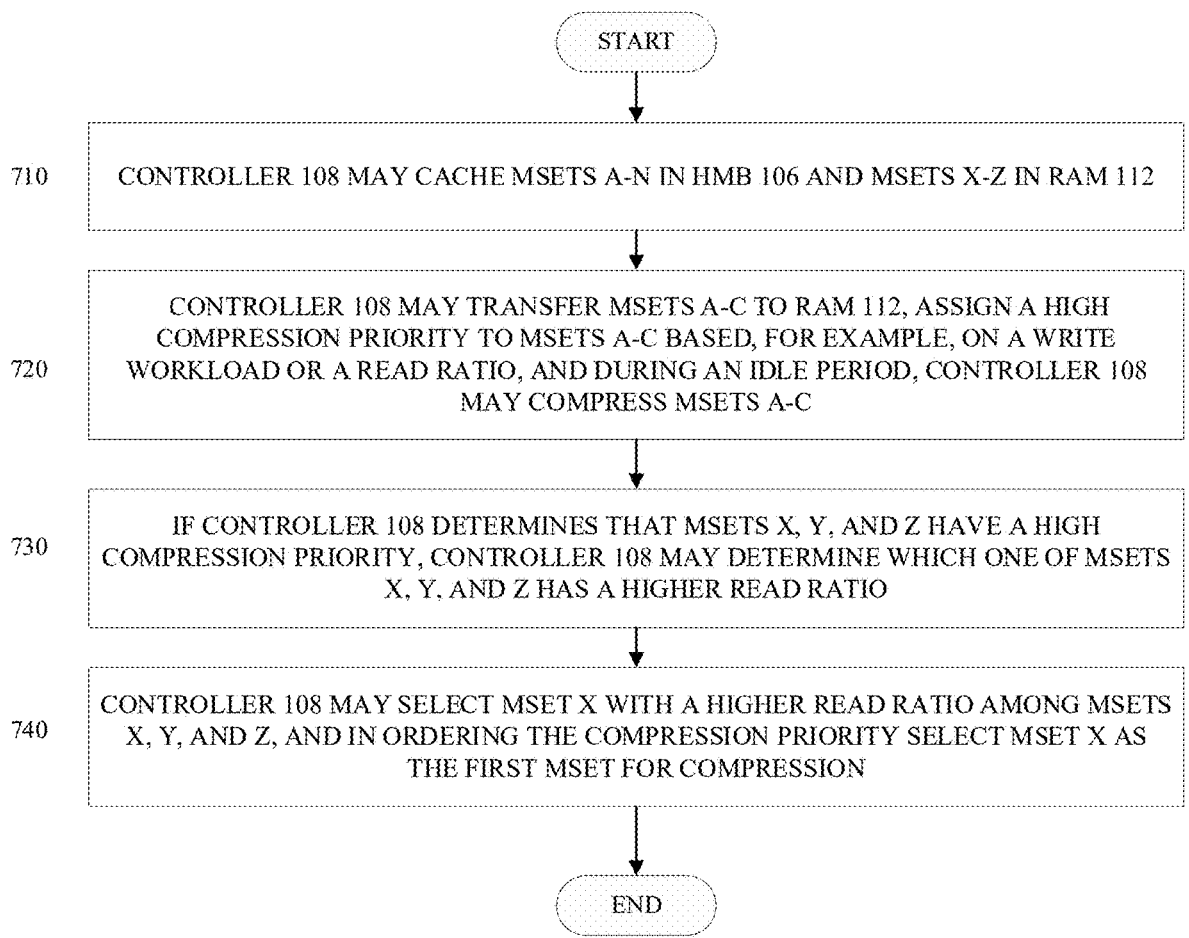
FIG. 7 is another flow diagram of an example process for dynamically assigning a compression priority to a mset based on a read ratio in accordance with some implementations.

FIG. 7 is another flow diagram of an example process for dynamically assigning a compression priority to a mset based on a read ratio in accordance with some implementations. At 710, controller 108 may cache msets A-N in HMB 106 and msets X-Z in RAM 112. At 720, controller 108 may transfer msets A-C to RAM 112, assign a high compression priority to mset A-C based, for example, on a write workload or a read ratio, and during an idle period, controller 108 may compress msets A-C. At 730, if controller 108 determines that msets X, Y, and Z have a high compression priority, controller 108 may determine which one of msets X, Y, and Z has a higher read ratio. AT 740, controller 108 may select mset X with a higher read ratio among msets X, Y, and Z, and in ordering the compression priority select mset X as the first mset for compression. As indicated above FIG. 7 is provided as an example. Other examples may differ from what is described in FIG. 7.

Figure 8:
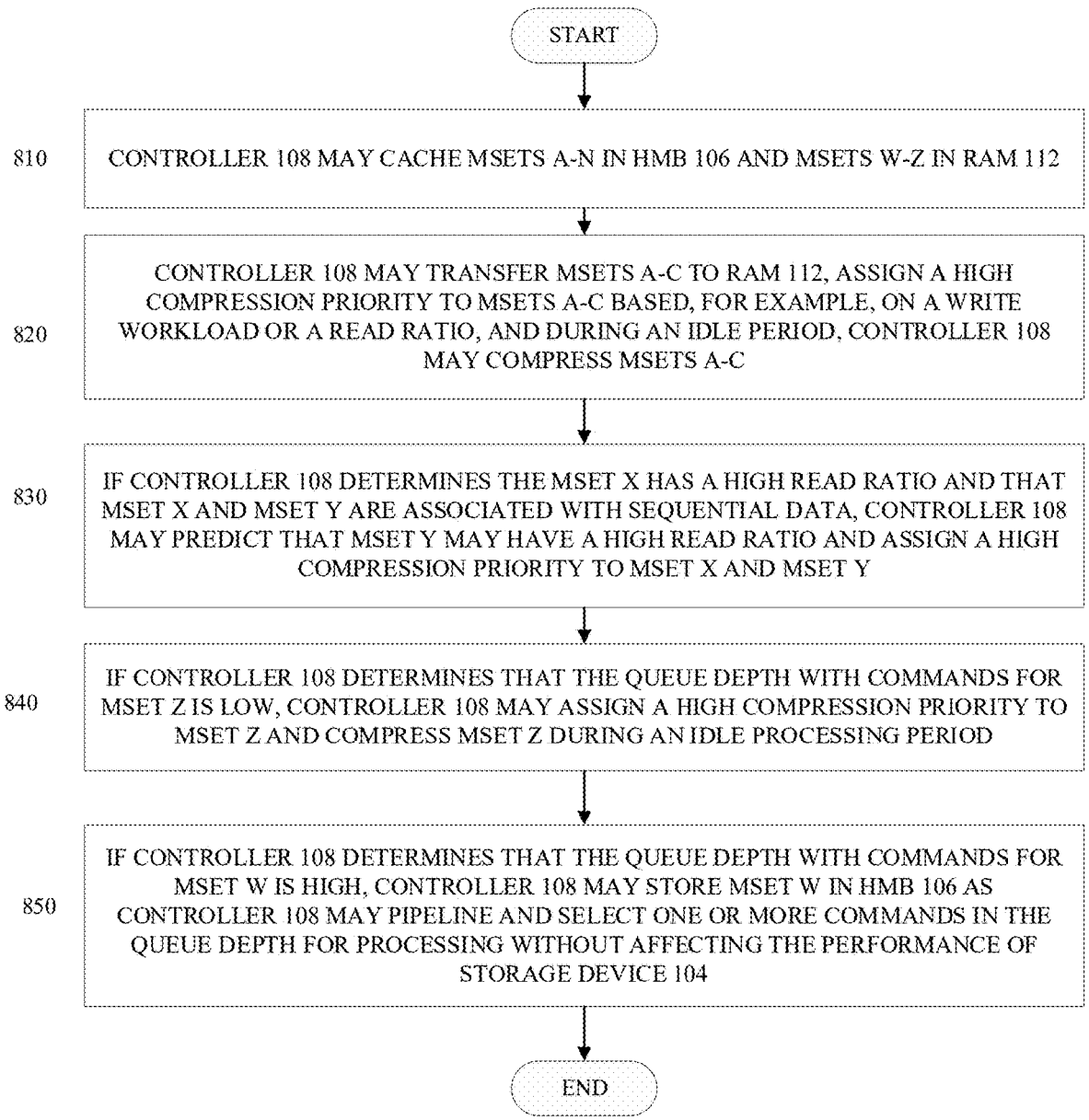
FIG. 8 is a flow diagram of an example process for dynamically assigning a compression priority to a mset based on a prediction or a queue depth in accordance with some implementations.

FIG. 8 is a flow diagram of an example process for dynamically assigning a compression priority to a mset based on a prediction or a queue depth in accordance with some implementations. At 810, controller 108 may cache msets A-N in HMB 106 and msets W-Z in RAM 112. At 820, controller 108 may transfer msets A-C to RAM 112, assign a high compression priority to mset A-C based, for example, on a write workload or a read ratio, and during an idle period, controller 108 may compress msets A-C. At 830, if controller 108 determines the mset X has a high read ratio and that mset X and mset Y are associated with sequential data, controller 108 may predict that mset Y may have a high read ratio and assign a high compression priority to mset X and mset Y. At 840, if controller 108 determines that the queue depth with commands for mset Z is low, controller 108 may assign a high compression priority to mset Z and compress mset Z during an idle processing period. At 850, if controller 108 determines that the queue depth with commands for mset W is high, controller 108 may store mset W in HMB 106 as controller 108 may pipeline and select one or more commands in the queue depth for processing without affecting the performance of storage device 104. As indicated above. FIG. 8 is provided as an example. Other examples may differ from what is described in FIG. 8.

Figure 9:
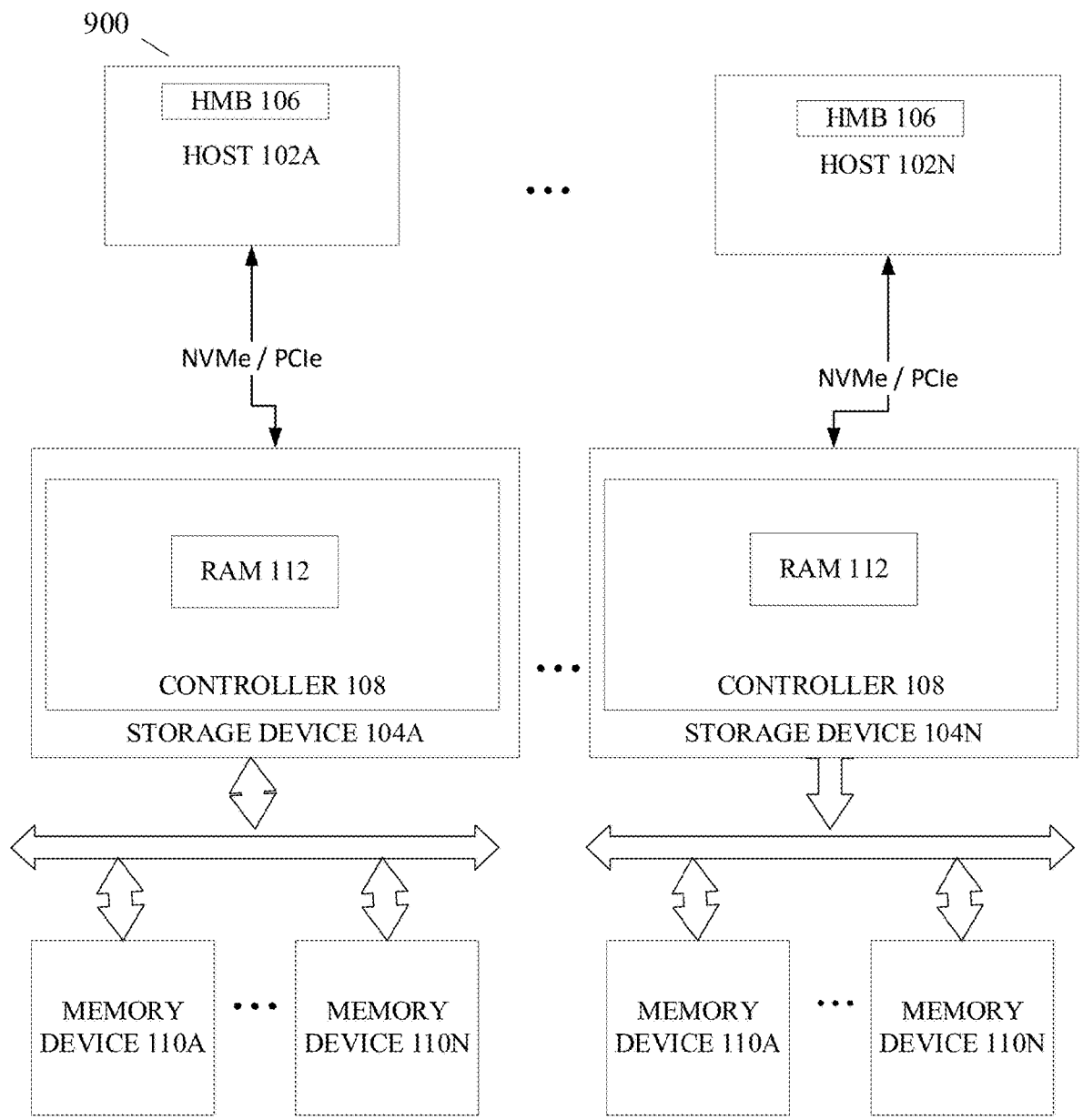
FIG. 9 is a diagram of an example environment in which systems and/or methods described herein are implemented.

FIG. 9 is a diagram of an example environment in which systems and/or methods described herein are implemented. As shown in FIG. 9, Environment 900 may include hosts 102-102n (referred to herein as host(s) 102), and one or more storage devices 104a-104n (referred to herein as storage device(s) 104). Storage device 104 may include a controller 108 to minimize updates to compressed msets based on a priority criterion. Hosts 102 and storage devices 104 may communicate via Non-Volatile Memory Express (NVMe) over peripheral component interconnect express (PCI Express or PCIe), or the like.

Devices of Environment 900 may interconnect via wired connections, wireless connections, or a combination of wired and wireless connections. For example, the network in FIG. 9 may include NVMe over Fabric(NVMe-oF) Internet Small Computer Systems Interface(iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of Environment 900 may perform one or more functions described as being performed by another set of devices of Environment 900.

Figure 10:
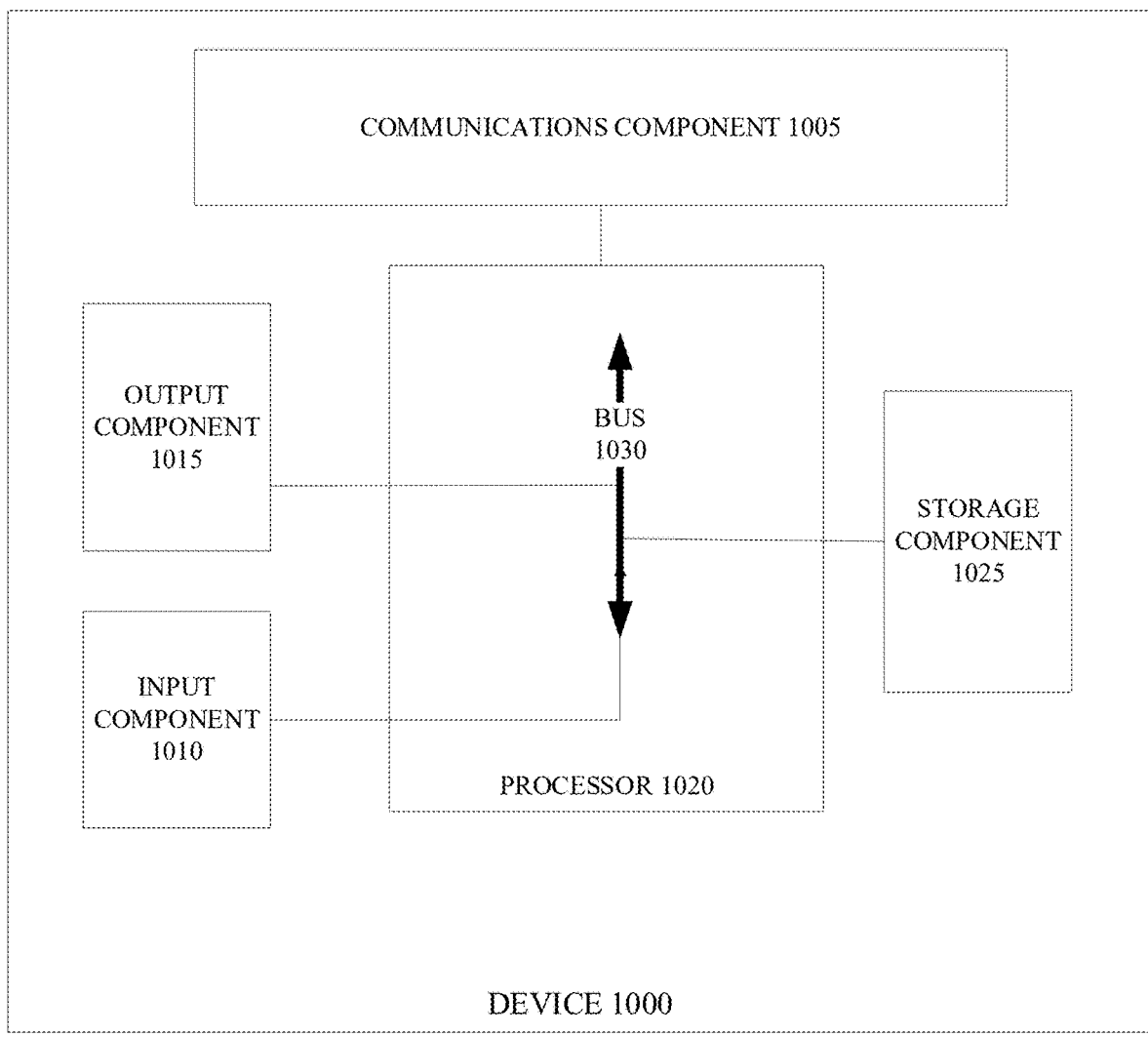
FIG. 10 is a diagram of example components of one or more devices of FIG. 1.

FIG. 10 is a diagram of example components of one or more devices of FIG. 1. In some implementations, host 102 may include one or more devices 1000 and/or one or more components of device 1000. Device 1000 may include, for example, a communications component 1005, an input component 1010, an output component 1015, a processor 1020, a storage component 1025, and a bus 1030. Bus 1030 may include components that enable communication among multiple components of device 1000, wherein components of device 1000 may be coupled to be in communication with other components of device 1000 via bus 1030.

Input component 1010 may include components that permit device 1000 to receive information via user input (e.g., keypad, a keyboard, a mouse, a pointing device, and a network/data connection port, or the like), and/or components that permit device 1000 to determine the location or other sensor information (e.g., an accelerometer, a gyroscope, an actuator, another type of positional or environmental sensor). Output component 1015 may include components that provide output information from device 1000 (e.g., a speaker, display screen, and network/data connection port, or the like). Input component 1010 and output component 1015 may also be coupled to be in communication with processor 1020.

Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 may include one or more processors capable of being programmed to perform a function. Processor 1020 may be implemented in hardware, firmware, and/or a combination of hardware and software.

Storage component 1025 may include one or more memory devices, such as random-access memory (RAM) 112, read-only memory (ROM), and/or another type of dynamic or static storage device (e.g., a flash memory, a magnetic memory, and/or optical memory) that stores information and/or instructions for use by processor 1020. A memory device may include memory space within a single physical storage device or memory space spread across multiple physical storage devices. Storage component 1025 may also store information and/or software related to the operation and use of device 1000. For example, storage component 1025 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 1005 may include a transceiver-like component that enables device 1000 to communicate with other devices, such as via a wired connection, a wireless connection, or a combination of wired and wireless connections. The communications component 1005 may permit device 1000 to receive information from another device and/or provide information to another device. For example, communications component 1005 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 1005 may also include one or more broadband and/or narrowband transceivers and/or other similar types of wireless transceiver configurable to communicate via a wireless network for infrastructure communications. Communications component 1005 may also include one or more local area network or personal area network transceivers, such as a Wi-Fi transceiver or a Bluetooth transceiver.

Device 1000 may perform one or more processes described herein. For example, device 1000 may perform these processes based on processor 1020 executing software instructions stored by a non-transitory computer-readable medium, such as storage component 1025. As used herein, the term "computer-readable medium" refers to a non-transitory memory device. Software instructions may be read into storage component 1025 from another computer-readable medium or from another device via communications component 1005. When executed, software instructions stored in storage component 1025 may cause processor 1020 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more," Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to minimize updates to compressed msets by limiting compression of msets based on a priority criterion, the storage device comprises:
    a memory including a logical-to-physical (L2P) table which is divided into msets that include a range of entries in the L2P table;
    a random-access memory to cache a first set of msets; and
    a controller to access the first set of msets to quickly read data from and write data to the memory, execute dynamic priority approaches for compression in selecting the msets that meet a priority criterion and are ready for compression, assign a high compression priority to the msets that are ready for compression based on the priority criterion, and compress the msets with the high compression priority during an idle period on the storage device.

2. The storage device of claim 1, wherein the priority criterion includes when the controller receives updates for the first set of msets and the controller determines that there is less than a predefined number of update entries for a first mset in the first set of msets, the controller assigns the high compression priority to first mset.

3. The storage device of claim 1, wherein the priority criterion includes when the controller receives updates for the first set of msets and the controller determines that there is greater than a predefined number of update entries for a second mset in the first set of insets, the controller assigns a low compression priority to second inset.

4. The storage device of claim 3, wherein when the controller merges the updates with the second inset and the controller determines that there are no further updates for the second inset, the controller assigns a high compression priority to second inset.

5. The storage device of claim 1, wherein when caches for the insets are full, the controller updates the insets with a low compression priority and performs compression on the insets with the low compression priority.

6. The storage device of claim 1, wherein the priority criterion includes when the controller determines that a first inset in the first set of insets has the high compression priority and a higher read ratio than other insets in the first set of insets, the controller selects the first inset for compression.

7. The storage device of claim 1, wherein the priority criterion includes when the controller predicts that a first inset in the first set of insets is likely to have high read ratio, the controller selects the first inset for compression.

8. The storage device of claim 1, wherein the priority criterion includes when the controller determines that a queue depth of a first mset in the first set of msets is low, the controller selects the first mset for compression.

9. The storage device of claim 1, wherein the controller caches a second set of the msets in a host memory buffer.

10. The storage device of claim 1, wherein the controller stores updates for a cached mset in a uLayer.

11. The storage device of claim 1, wherein the controller compresses the msets assigned the high compression priority during an idle processing time on the storage device.

12. A method for minimizing updates to compressed msets on a storage device by limiting compression of msets based on a priority criterion, the storage device comprises a controller to execute the method comprising:

accessing a first set of msets cached on a random-access memory in the storage device to quickly read data from and write data to a memory device;

executing dynamic priority approaches for compression in selecting msets that meet a priority criterion and are ready for compression;

assigning a high compression priority to the insets that are ready for compression based on the priority criterion; and compressing the insets with the high compression priority during an idle processing period.

13. The method of claim 12, wherein the assigning comprises receiving updates for the first set of insets, determining that there is less than a predefined number of update entries for a first inset in the first set of insets, and assigning the high compression priority to first inset.

14. The method of claim 12, wherein the assigning comprises receiving updates for the first set of insets, determining that there is greater than a predefined number of update entries for a second inset in the first set of insets, and assigning a low compression priority to second inset.

15. The method of claim 14, further comprising merging the updates with the second inset, determining that there are no further updates for the second inset, and assigning the high compression priority to second inset.

16. The method of claim 12, further comprising determining that caches for the insets are full, updating the insets with a low compression priority, and performing compression on the insets with the low compression priority.

17. The method of claim 12, wherein the assigning comprises determining that a first mset in the first set of msets has the high compression priority and a higher read ratio than other msets in the first set of msets and selecting the first mset for compression.

18. The method of claim 12, wherein the assigning comprises predicting that a first mset in the first set of msets is likely to have high read ratio and selecting the first mset for compression.

19. The method of claim 12, wherein the assigning comprises determining that a queue depth of a first mset in the first set of msets is low and selecting the first mset for compression.

20. A storage device to minimize updates to compressed msets by limiting compression of msets based on a priority criterion, the storage device comprises:

a memory including a logical-to-physical (L2P) table which is divided into msets that include a range of entries in the L2P table;

a random-access memory to cache a first set of msets; and a controller to access the first set of msets to quickly read data from and write data to the memory, determine at least one of a uLayer state for a first mset in the first set of msets, a read ratio for the first mset, a prediction for the first mset, and a queue depth for the first mset in determining whether the first mset meets a priority criterion and is ready for compression, assign a high compression priority to the first mset if the first mset meets the priority criterion, and compress the first mset assigned the high compression priority.

* * * * *